(12) United States Patent
Seo et al.

(10) Patent No.: US 12,275,229 B2
(45) Date of Patent: Apr. 15, 2025

(54) SENSOR FOR MEASURING TEMPERATURE CHANGE AMOUNT

(71) Applicant: Amorepacific Corporation, Seoul (KR)

(72) Inventors: Jeong Eun Seo, Yongin-si (KR); Hyun Hyub Ko, Ulsan (KR); Jin Young Myoung, Gwangyang-si (KR); Jong Hwa Park, Changwon-si (KR); Young Oh Lee, Ulsan (KR); Young Kyung Kim, Yongin-si (KR); Seung Han Park, Yongin-si (KR); Won Seok Park, Yongin-si (KR); Sung Won Yi, Yongin-si (KR); Tae Ryong Lee, Yongin-si (KR); Byung Guen Chae, Yongin-si (KR)

(73) Assignee: Amorepacific Corporation, Seoul (KR)

( * ) Notice: Subject to any disclaimer, the term of this patent is extended or adjusted under 35 U.S.C. 154(b) by 228 days.

(21) Appl. No.: 17/910,715

(22) PCT Filed: Mar. 12, 2021

(86) PCT No.: PCT/KR2021/003077
§ 371 (c)(1),
(2) Date: Sep. 9, 2022

(87) PCT Pub. No.: WO2021/182907
PCT Pub. Date: Sep. 16, 2021

(65) Prior Publication Data
US 2023/0302769 A1    Sep. 28, 2023

(30) Foreign Application Priority Data

Mar. 12, 2020 (KR) .................. 10-2020-0030855

(51) Int. Cl.
*B32B 9/04* (2006.01)
*B32B 27/18* (2006.01)
(Continued)

(52) U.S. Cl.
CPC .............. *B32B 9/045* (2013.01); *B32B 27/18* (2013.01); *B32B 27/283* (2013.01);
(Continued)

(58) Field of Classification Search
None
See application file for complete search history.

(56) References Cited

U.S. PATENT DOCUMENTS

2020/0010739 A1* 1/2020 Wyrebek .............. H05K 9/0081

FOREIGN PATENT DOCUMENTS

| CN | 109916527 A | 6/2019 |
|---|---|---|
| JP | 05-099759 A | 4/1993 |

(Continued)

OTHER PUBLICATIONS

Machine translation of KR 10-1917965 (Year: 2019).*
(Continued)

*Primary Examiner* — Ramsey Zacharia
(74) *Attorney, Agent, or Firm* — Sughrue Mion, PLLC

(57) ABSTRACT

A sensor for measuring a temperature change amount. The sensor includes a first composite material layer including a polymer having a volume changing according to a temperature change amount; an electrode layer provided on one side of the first composite material layer and capable of representing the temperature change amount as a resistance change amount; and a second composite material layer at least partially provided on the upper side of the first composite material layer and containing polydimethylsiloxane (PDMS) and at least one of carbon nanotubes (CNT), boron nitride nanotubes (BNNT), and graphene or containing a thermoplastic polyurethane (TPU) so that the temperature change occurring on one side thereof is transferred to the other side thereof.

9 Claims, 7 Drawing Sheets

(51) Int. Cl.
    *B32B 27/28*          (2006.01)
    *B32B 27/30*          (2006.01)
    *G01K 7/18*           (2006.01)

(52) U.S. Cl.
    CPC ............ *B32B 27/304* (2013.01); *G01K 7/183* (2013.01); *B32B 2250/03* (2013.01); *B32B 2307/20* (2013.01); *B32B 2457/00* (2013.01)

(56) References Cited

FOREIGN PATENT DOCUMENTS

| | | |
|---|---|---|
| JP | 2003-217904 A | 7/2003 |
| JP | 2014-87984 A | 5/2014 |
| JP | 2018-031542 A | 3/2018 |
| JP | 2018-79298 A | 5/2018 |
| JP | 2019-181826 A | 10/2019 |
| KR | 10-1917965 B1 | 1/2019 |
| KR | 10-1943519 B1 | 1/2019 |

OTHER PUBLICATIONS

Machine translation of KR 10-1943519 (Year: 2019).*
Machine translation of JP 05-099759 (Year: 1993).*
International Search Report for PCT/KR2021/003077 dated Jun. 11, 2021 [PCT/ISA/210].

* cited by examiner

[FIG. 1]
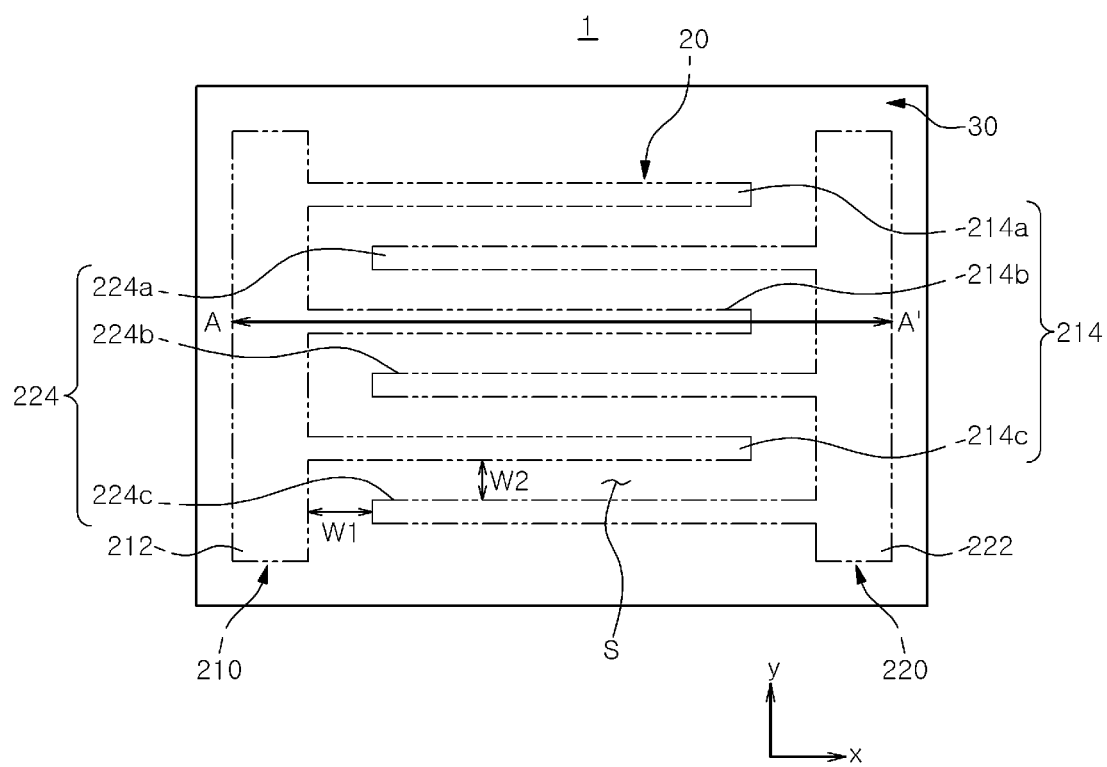

[FIG. 2]
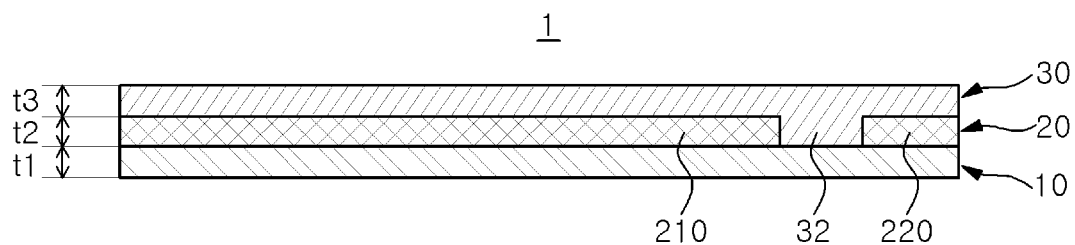

[FIG. 3]
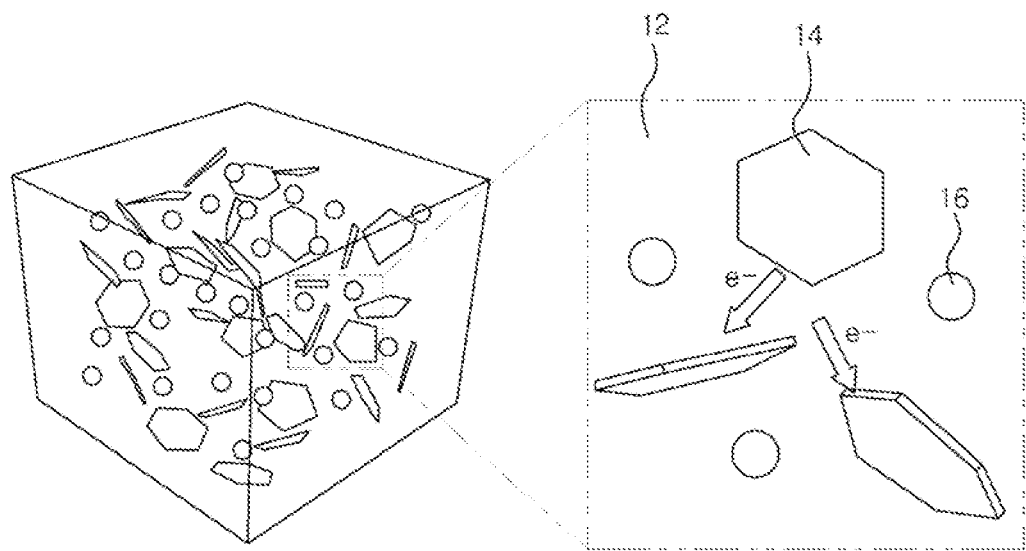
[FIG. 4]
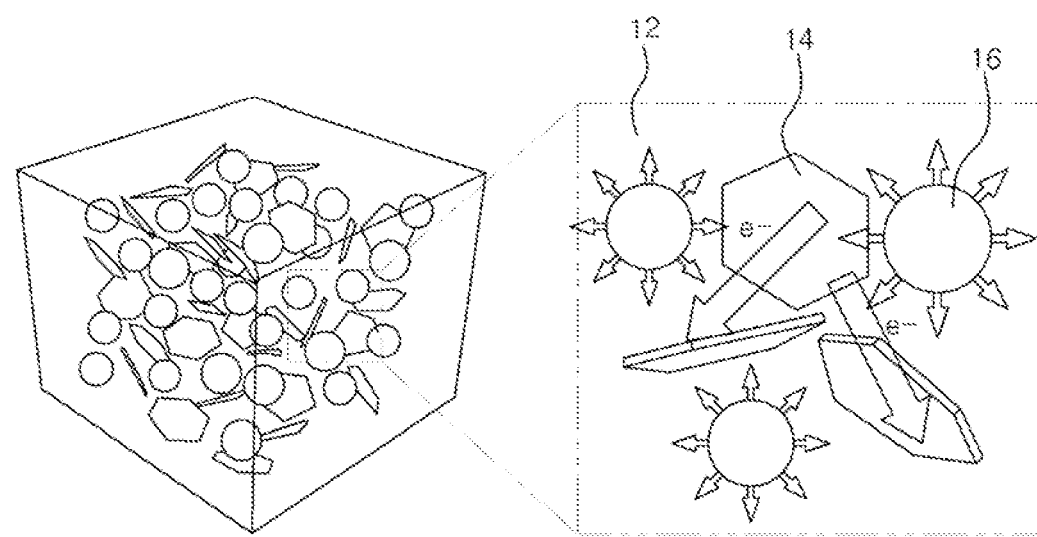

[FIG. 5]
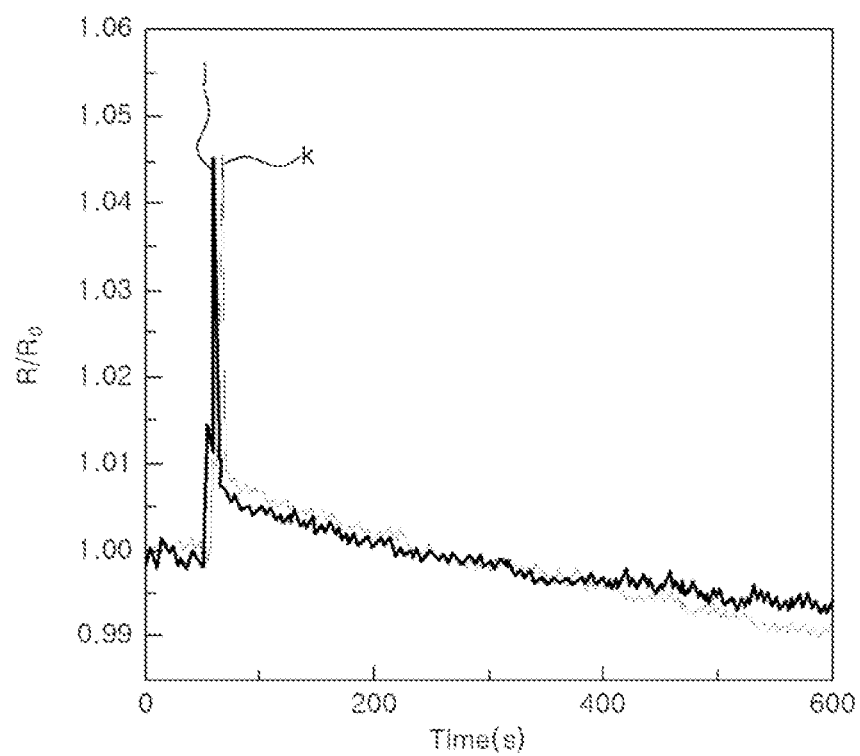

[FIG. 6]
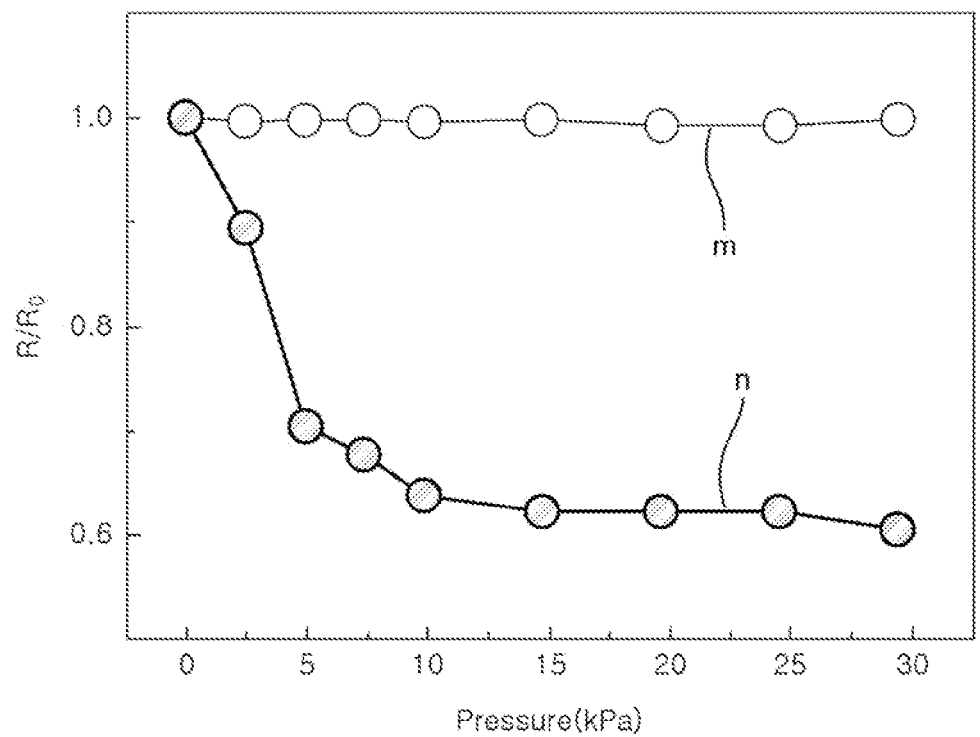

[FIG. 7]
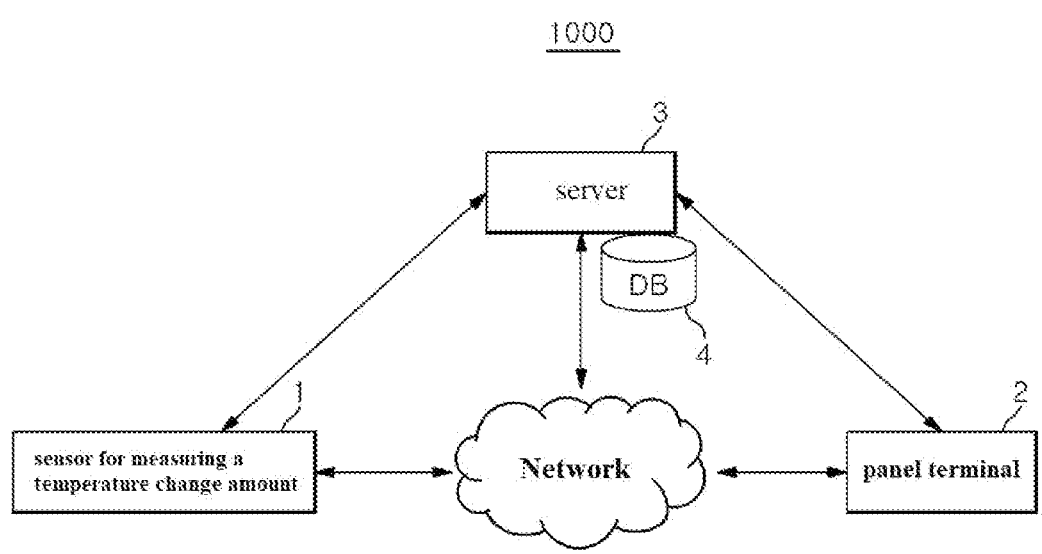

[FIG. 8]
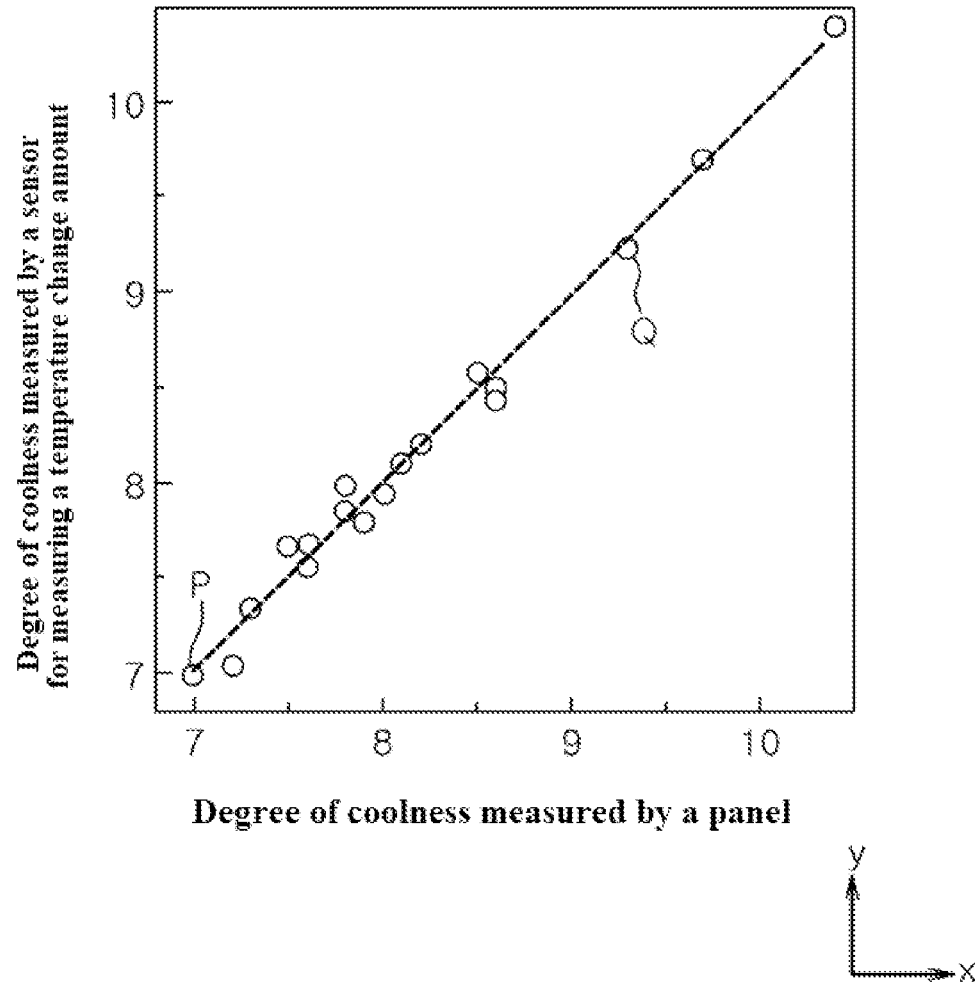

SENSOR FOR MEASURING TEMPERATURE CHANGE AMOUNT

CROSS REFERENCE TO RELATED APPLICATIONS

This application is a National Stage of International Application No. PCT/KR2021/003077 filed Mar. 12, 2021, claims priority of Korean Patent Application No 10-2020-0030855, filed on Mar. 12, 2020 with the Korean Intellectual Property Office.

TECHNICAL FIELD

The present invention relates to a sensor for measuring a temperature change amount.

BACKGROUND ART

Recently, there is an increasing demand for cosmetics having a feeling of use (stickiness, coolness, spreadability, etc.) suitable for one's preference.

In response to this demand for cosmetics, most cosmetics manufacturers are developing new products and are developing emotional marketing strategies through analysis of the feeling of use (stickiness, coolness, spreadability, etc.) of cosmetics, and in order to measure the feeling of use of cosmetics, they employ and operate experts for feeling of use.

As such, although experts are used or various studies are being conducted to measure the feeling of use of cosmetics, there is a problem in that it is difficult to quantify the feeling of use.

In particular, among the feeling of use, there is no device for quantitatively measuring the coolness according to the evaporation of cosmetics, so it is difficult to quickly measure the feeling of using a large amount of cosmetics because it is necessary to rely on the experience of a professional manpower to indicate the coolness.

In addition, since these professional personnel are affected by physical condition on the day of measurement, external temperature and humidity, etc., there is a problem in that the degree of coolness cannot be accurately measured.

DISCLOSURE

Technical Problem

Embodiments of the present invention have been proposed to solve the above problems, and an object of the present invention is to provide a sensor for measuring a temperature change amount capable of quantitatively measuring the degree of coolness according to evaporation of cosmetic materials.

Technical Solution

According to an embodiment of the present invention, a sensor for measuring a temperature change amount may be provided, wherein the sensor for measuring a temperature change amount includes: a first composite material layer including a polymer having a volume changing according to an temperature change amount; an electrode layer provided on one side of the first composite material layer and capable of representing the temperature change amount as a change amount in resistance; and a second composite material layer, at least a portion of which is provided on the upper side of the first composite material layer, containing at least one of carbon nanotubes (CNT), boron nitride nanotubes (BNNT) and graphene; and containing polydimethylsiloxane (PDMS) or containing thermoplastic polyurethane elastomer (Thermoplastic PolyUrethane, TPU) so that a temperature change occurring on one side is transferred to the other side.

In addition, the sensor for measuring a temperature change amount in which the thickness of the second composite material layer is 1 μm to 30 μm may be provided.

In addition, the sensor for measuring a temperature change amount in which the second composite material layer is formed of carbon nanotube (CNT) and polydimethylsiloxane (PDMS), wherein the weight ratio of the carbon nanotube (CNT) is 15% to 20%, may be provided.

In addition, the sensor for measuring a temperature change amount in which the second composite material layer is formed of a thermoplastic polyurethane elastomer (TPU), wherein the thickness of the second composite material layer is provided in a range of 1 μm to 10 μm, may be provided.

In addition, the sensor for measuring a temperature change amount in which the electrode layer includes: a first electrode disposed on an upper side of the first composite material layer; and a second electrode spaced apart from the first electrode, wherein the first electrode and the second electrode are disposed on the same plane, may be provided, In addition, the sensor for measuring a temperature change amount in which the first electrode includes: a first vertical electrode disposed in one direction; and a plurality of first horizontal electrodes extending at a preset angle from the first vertical electrode, and the second electrode includes: a second vertical electrode disposed in one direction; and a plurality of second horizontal electrodes extending at a preset angle from the second vertical electrode, wherein the plurality of first horizontal electrodes and the plurality of second horizontal electrodes are alternately disposed and parallel to each other, may be provided.

In addition, the sensor for measuring a temperature change amount in which the second composite material layer is in contact with the first electrode and the second electrode, and at the same time, is in contact with the first composite material layer between the first electrode and the second electrode, may be provided.

In addition, the sensor for measuring a temperature change amount in which an upper surface of the second composite material layer is flat, and a lower surface of the second composite material layer is provided with a convex portion for filling a gap between the first electrode and the second electrode, may be provided.

In addition, the sensor for measuring a temperature change amount in which the first composite material layer contains polyvinylidene fluoride (PVDF), graphene oxide (rGO), and a semi-crystalline polymer mixed with polyvinylidene fluoride (PVDF) and graphene oxide (rGO), may be provided.

In addition, the sensor for measuring a temperature change amount in which the semi-crystalline polymer is polyethylene oxide (PEO) may be provided.

In addition, according to another embodiment of the present invention, a matching system may be provided, the matching system including: a server capable of converting a change amount in resistance measured by the sensor for measuring a temperature change amount into a preset first numerical value for coolness, wherein the server may compare and represent the second numerical value for coolness input from a panel terminal with the first numerical value.

In addition, the matching system including: a database storing a correlation between the change amount of the resistance and the first numerical value, wherein the correlation between the change amount of the resistance and the first numerical value may be updated by the server, may be provided.

Effect of the Invention

The sensor for measuring a temperature change amount according to an embodiment of the present invention has an advantage of being able to quantitatively measure the degree of coolness according to the evaporation of the cosmetic materials.

BRIEF DESCRIPTION OF THE DRAWINGS

FIG. 1 is a diagram schematically showing the top view of the sensor for measuring a temperature change amount according to the embodiment of the present invention.

FIG. 2 is a cross-sectional view taken along line A-A' of the sensor for measuring a temperature change amount of FIG. 1.

FIG. 3 is a view conceptually illustrating the configuration of the first composite material layer before the temperature is increased.

FIG. 4 is a view conceptually illustrating the configuration of the first composite material layer after the first composite material layer of FIG. 3 is heated.

FIG. 5 is a graph in which the degree of coolness that a user can feel over time after the cosmetic materials are applied to the sensor for measuring a temperature change amount of FIG. 1 is measured as the change amount in resistance.

FIG. 6 is a graph illustrating a resistance change measured when an external force (pressure) is applied to the sensor for measuring a temperature change amount of FIG. 1.

FIG. 7 is a diagram schematically illustrating the matching system capable of comparing the numerical value for coolness measured by the sensor for measuring a temperature change amount of FIG. 1 and the numerical value for coolness measured by an expert panel.

FIG. 8 is a graph showing a comparison between the coolness measured by the sensor for measuring a temperature change amount of FIG. 1 and the coolness result detected by the expert panel.

BEST MODE

Hereinafter, specific embodiments of the present invention will be described in detail with reference to the drawings. In addition, in describing the present invention, if it is determined that a detailed description of a related known configuration or function may obscure the gist of the present invention, the detailed description thereof will be omitted.

FIG. 1 is a diagram schematically showing the top view of the sensor for measuring a temperature change amount according to the embodiment of the present invention, and FIG. 2 is a cross-sectional view taken along line A-A' of the sensor for measuring a temperature change amount 1 of FIG. 1.

With reference to FIGS. 1 and 2, a sensor for measuring a temperature change amount 1 according to an embodiment of the present invention includes a first composite material layer 10 capable of detecting a temperature change amount, an electrode layer 20 capable of representing a temperature change amount as a change amount in resistance, and a second composite material layer 30 provided with a material having excellent thermal conductivity.

The sensor for measuring a temperature change amount 1 of the present embodiment may sensitively sense the temperature change in real time. For example, a cosmetic material sample may be placed on the upper surface of the second composite material layer 30 of the sensor for measuring a temperature change amount 1, and as the cosmetic materials are evaporated, the temperature change corresponding to heat of evaporation may be measured as a change of resistance.

Such a sensor for measuring a temperature change amount 1 may be understood as a sensor capable of quantitatively (numerically) measuring the coolness felt by the user as the cosmetic materials are evaporated after the user applies the cosmetic materials to the skin.

In this embodiment, for convenience of description, the x-axis direction of FIG. 1 is defined as the horizontal direction and the y-axis direction is defined as the vertical direction.

The first composite material layer 10 may be a plate having a preset thickness t1. For example, the thickness t1 of the first composite material layer 10 may be 10 μm to 100 μm. Preferably, the thickness t1 of the first composite material layer 10 may be 20 μm to 50 μm. More preferably, the thickness t1 of the first composite material layer 10 may be 30 μm.

In addition, the first composite material layer 10 may be formed of a composite material capable of detecting a small temperature change in units of 0.1° C.

The first composite material layer 10 may be provided with a material having excellent temperature sensing sensitivity. For example, the first composite material layer 10 may be a composite material in which polyvinylidene fluoride (PVDF), graphene oxide (rGO), and a semi-crystalline polymer (e.g., polyethylene oxide (PEO)) are mixed.

Here, the semi-crystalline polymer (e.g., polyethylene oxide (PEO)) may change in volume depending on the temperature, the semi-crystalline polymer applies pressure to surrounding materials to change the electrical properties (electrical conductivity) of the first composite material layer 10, and a change in electrical conductivity in the first composite material layer 10 may be detected in the electrode layer 20. That is, the temperature change due to evaporation of the cosmetic materials on the upper surface of the second composite material layer 30 is transferred to the first composite material layer 10 containing the semi-crystalline polymer, the change in electrical conductivity of the first composite material layer 10 may be measured so that the temperature change occurring on the upper surface of the second composite material layer 30 may be quantitatively measured.

A more detailed description thereof will be given later.

The electrode layer 20 may be provided on the upper side of the first composite material layer 10, and the temperature change amount of the first composite material layer 10 may be represented by converting it into the resistance change amount.

The electrode layer 20 has a preset thickness t2 and may include a pair of electrodes 210 and 220 spaced apart from each other. For example, the electrode layer 20 includes a first electrode 210 disposed on an upper side of the first composite material layer 10 and a second electrode 220 spaced apart from the first electrode 210, wherein the first electrode 210 and the second electrode 220 may be disposed on the same plane. Also, the electrode layer 20 may be made of a metal having thermal conductivity.

When the first electrode 210 and the second electrode 220 are disposed on the same plane, regardless of the force (pressure) applied to the sensor for measuring a temperature change amount 1, the temperature change amount occurring in the sensor for measuring a temperature change amount 1 may be measured. A more detailed description thereof will be described later with reference to FIG. 6.

The electrode layer 20 including the first electrode 210 and the second electrode 220 may cover an area of 50% or more of the upper surface of the first composite material layer 10. Preferably, the electrode layer 20 may cover an area of 80% or more of the upper surface of the first composite material layer 10. More preferably, the electrode layer 20 may cover an area of 95% or more of the upper surface of the first composite material layer 10.

Specifically, by having a structure in which at least a portion of the first electrode 210 and the second electrode 220 alternately cross each other, the electrode layer 20 may cover a large area over the entire upper surface of the first composite material layer 10.

The first electrode 210 may include a first vertical electrode 212 disposed in one direction and a plurality of first horizontal electrodes 214 extending at a preset angle from the first vertical electrode 212, wherein the angle between the first vertical electrode 212 and the first horizontal electrode 214 may be 90°.

The second electrode 220 may include a second vertical electrode 222 disposed in one direction and a plurality of second horizontal electrodes 224 extending at a preset angle from the second vertical electrode 222, wherein the angle between the second vertical electrode 222 and the second horizontal electrode 224 may be 90°.

The plurality of second horizontal electrodes 224 and the plurality of first horizontal electrodes 214 may be alternately disposed and may be parallel to each other. For example, a first-first horizontal electrode 214a among the plurality of first horizontal electrodes 214 is disposed, a first-second horizontal electrode 224a among the plurality of second horizontal electrodes 224 is disposed, and a second-first horizontal electrode 214b among the plurality of first horizontal electrodes 214 is disposed, a second-second horizontal electrode 224b among the plurality of second horizontal electrodes 224 is disposed, and a third-first horizontal electrode 214c among the plurality of first horizontal electrodes 214 may be disposed, and a third-second horizontal electrode 224c among the plurality of second horizontal electrodes 224 may be disposed.

In this embodiment, the number of the first horizontal electrode 214 and the second horizontal electrode 224 are each described as an example of three, but the number of the first horizontal electrode 214 and the second horizontal electrode 224 may vary depending on a ratio capable of covering the upper surface of the first composite material layer 10, but the number is not limited thereto. As described above, by implementing a structure in which the first horizontal electrode 214 of the first electrode 210 and the second horizontal electrode 224 of the second electrode 220 are alternately disposed with each other, the electrode layer 20 is formed of the first composite material, it may be possible to precisely measure the temperature change amount occurring in the entire sensor for measuring a temperature change amount 1 since the electrode layer 20 can cover a large area over the upper surface of the first composite material layer 10.

In addition, the width W1 at which the first electrode 210 and the second electrode 220 are horizontally spaced apart may be 0.1 mm to 1.0 mm, and the width W2 at which the first electrode 210 and the second electrode 220 are vertically spaced apart may be 0.1 mm to 1.0 mm. However, the width at which the first electrode 210 and the second electrode 220 are spaced apart may be changed according to the size of the sensor for measuring a temperature change amount 1.

In addition, the thickness t2 of the electrode layer 20 may be provided in a range of 10 nm to 100 nm. Preferably, the thickness t2 of the electrode layer 20 may be provided in a range of 20 nm to 80 nm. More preferably, the thickness t2 of the electrode layer 20 may be 50 nm. In this way, since the thickness of the electrode layer 20 is provided to be thin, the temperature change occurring on the surface of the second composite material layer 30 due to evaporation of the cosmetic materials may be easily transferred to the first composite material layer 10 through the electrode layer 20.

The second composite material layer 30 may be provided on the upper side of the first composite material layer 10 and the electrode layer 20.

The second composite material layer 30 may cover the first electrode 210 and the second electrode 220 and at the same time, may cover the first composite material layer 10. Specifically, the upper surface of the second composite material layer 30 may be provided in a flat plate shape, and the lower surface of the second composite material layer 30 may be in contact with upper surfaces of the first electrode 210 and the second electrode 220 and at the same time, may be in contact with at least a portion of the upper surface of the first composite material layer 10.

A convex portion 32 for filling the gap S between the first electrode 210 and the second electrode 220 may be provided under the second composite material layer 30, wherein the convex portion 32 is provided between the first electrode 210 and the second electrode 220, and may have a convex shape downward with respect to a plane contacting the first electrode 210 and the second electrode 220.

As such, since the convex portion 32 is provided, the second composite material layer 30 and the first composite material layer 10 may be in direct contact, and therefore the temperature change occurring in the second composite material layer 30 may be more accurately transferred to the first composite material layer (10).

The second composite material layer 30 may protect the electrode layer 20 from the outside, thereby preventing degradation of the performance of the sensor for measuring a temperature change amount 1 due to repeated use, wherein the second composite material layer 30 may be understood as a protective layer.

The second composite material layer 30 may be formed of a material having high thermal conductivity and wear resistance. For example, the second composite material layer 30 may contain at least one of carbon nanotube (CNT), boron nitride nanotube (BNNT) and graphene, and polydimethylsiloxane (PDMS).

For example, the second composite material layer 30 may be formed of 5% to 15% weight ratio of carbon nanotube (CNT), 5% to 15% weight ratio of boron nitride nanotube (BNNT), 1% to 5% weight ratio of graphene (graphene), and 85% to 99% weight ratio of polydimethylsiloxane (PDMS).

For example, the second composite material layer 30 may be formed of carbon nanotubes (CNT) and polydimethylsiloxane (PDMS), and the weight ratio of carbon nanotubes (CNT) may be 5% to 15%. In this case, the thermal conductivity of the second composite material layer 30 may be increased.

In addition, the second composite material layer 30 may be formed of a thermoplastic polyurethane elastomer (TPU).

By forming the second composite material layer 30 of a material having high thermal conductivity, when cosmetic materials are applied on the upper side of the second composite material layer 30, the degree of temperature change due to the evaporation of the cosmetic materials may be transferred quickly to the first composite material layer 10.

More specifically, the temperature change of the upper side of the second composite material layer 30 may be transferred to the first composite material layer 10, electrical conductivity of the first composite material layer 10 may change according to the temperature change of the first composite material layer 10, and by detecting in the electrode layer 20 a change in electrical conductivity in the first composite material layer 10, the temperature change in the upper side of the second composite material layer 30 may be quantitatively represented. A detailed description of the change in electrical conductivity according to the temperature change of the first composite material layer 10 will be described later.

That is, by providing the second composite material layer 30 formed of a material having high thermal conductivity, the temperature change due to evaporation of the cosmetic materials that occurs on the upper surface of the second composite material layer 30 may be transferred efficiently to the first composite material layer 10.

The thickness t3 of the second composite material layer 30 may be 1 μm to 30 μm. Preferably, the thickness t3 of the second composite material layer 30 may be 1 μm to 10 μm. By providing the second composite material layer 30 with such a thin thickness, the temperature change due to the evaporation of the cosmetic materials may be transferred effectively.

In addition, when the second composite material layer 30 is formed of a thermoplastic polyurethane elastomer (TPU), the thickness of the second composite material layer 30 may be 1 μm to 10 μm.

In addition, the second composite material layer 30 may cover the first electrode 210 and the second electrode 220, and at the same time, may cover the first composite material layer 10 exposed through the gap S between the first electrode 210 and the second electrode 220.

When the second composite material layer 30 is viewed based on the cross section A-A', the upper surface of the second composite material layer 30 is flat, but the lower surface of the second composite material layer 30 may include the convex portion 32 filling the gap S between the first electrode 210 and the second electrodes 220.

As described above, by providing the convex portion 32, the second composite material layer 30 and the first composite material layer 10 may be in direct contact with each other, and therefore the temperature change occurring in the second composite material layer 30 may be directly transferred to the first composite material layer 10.

In the above-described embodiment, it has been described that the first composite material layer 10, the electrode layer 20, and the second composite material layer 30 are stacked as an example, but in the lower portion of the first composite material layer 10, a substrate layer (not shown) provided as PDMS may be further included under the first composite material layer 10.

In addition, in the lower portion of the substrate layer, a heating layer (not shown) capable of maintaining a condition of 33 to 37° C. similar to human skin temperature may be further included.

FIG. 3 is a view conceptually illustrating the configuration of the first composite material layer 10 before the temperature is increased, and FIG. 4 is a view conceptually illustrating the configuration of the first composite material layer 10 after the first composite material layer 10 of FIG. 3 is heated.

Hereinafter, the first composite material layer 10 will be described in more detail with reference to FIGS. 3 and 4.

The first composite material layer 10 may be provided as a composite material whose electrical conductivity may change according to a temperature change. For example, the first composite material layer 10 may include a polymer matrix 12, a conductive filler 14, and a semi-crystalline polymer 16.

In this embodiment, it is described as an example that the polymer matrix 12 is polyvinylidene fluoride (PVDF), the conductive filler 14 is graphene oxide (rGO), and the semi-crystalline polymer 16 is polyethylene oxide (PEO). However, the present invention is not limited thereto, and the first composite material layer 10 may be provided with another composite material whose electrical conductivity may change according to the temperature change.

The first composite material layer 10 may have a structure in which graphene oxide (rGO) 14 and polyethylene oxide (PEO) 16 are distributed in polyvinylidene fluoride (PVDF) 12.

Polyvinylidene fluoride (PVDF) 12 is a resin in which hydrogen atoms are partially substituted with fluorine atoms in the molecular structure of aliphatic hydrocarbons, and has excellent chemical resistance, mechanical, thermal and electrical properties of fluororesin, and represents excellent mechanical strength among fluororesins due to its high crystallinity, thereby providing excellent physical properties to composite materials.

Graphene oxide (rGO) 14 may implement high withstand voltage strength while having excellent thermal and electrical conductivity properties. Graphene oxide (rGO) 14 may exhibit high compatibility in thermosetting resins, and be added to a polymer matrix to be used as a conductive material and a temperature sensing material.

The composite material made of polyvinylidene fluoride (PVDF) 12 and graphene oxide (rGO) 14 has NTC properties, so it may be used as a temperature sensing material.

Composite materials composed of only polyvinylidene fluoride (PVDF) 12 and graphene oxide (rGO) 14 do not have a large change in resistance with temperature, so temperature sensitivity is low, thereby making it difficult to apply to high-accuracy temperature sensors. In this embodiment, in order to solve this problem, the first composite material layer 10 is formed by mixing polyethylene oxide (PEO) 16 with polyvinylidene fluoride (PVDF) 12 and graphene oxide (rGO) 14.

Polyethylene oxide (PEO) 16 is a semi-crystalline polymer and has a property of expanding or contracting in volume depending on temperature.

Polyethylene oxide (PEO) 16 is uniformly distributed in a material made of polyvinylidene fluoride (PVDF) 12 and graphene oxide (rGO) 14, and by this distribution, the temperature sensing sensitivity of the first composite material layer 10 made of polyvinylidene fluoride (PVDF) 12, graphene oxide (rGO) 14, and polyethylene oxide (PEO) 16 may be improved. The temperature sensing sensitivity of the first composite material layer 10 may be 0.1° C.

FIG. 3 shows the polyethylene oxide (PEO) 16 before the volume increases before the temperature rises, and FIG. 4 shows the polyethylene oxide (PEO) 16 after the volume increases after the temperature rises.

A characteristic in which the temperature change amount is sensed by the first composite material layer 10 will be described as follows.

When the first composite material layer 10 is heated, the particles of polyethylene oxide (PEO) 16 expand as the temperature increases, the expanded polyethylene oxide (PEO) 16 applies pressure to polyvinylidene fluoride (PVDF) 12 and graphene oxide (rGO) 14 and increases the contact area between the graphene oxides (rGO) 14, and therefore the electrical properties (electrical conductivity) of the first composite material layer 10 may be changed.

As such, a change in electrical properties (electrical conductivity) of the first composite material layer 10 according to the temperature change amount may be detected by the electrode layer 20 and appear as a change amount in resistance.

Hereinafter, after placing the cosmetic materials (sample) on the sensor for measuring a temperature change amount 1, a process for measuring the degree of coolness as the cosmetic materials are evaporated will be described.

For the experiment, by heating the lower part of the sensor for measuring a temperature change amount 1, it may be set to the same temperature condition as the skin.

When the cosmetic materials (sample) are flatly spread over a wide range on the upper portion of the second composite material layer 30, the cosmetic materials are evaporated over time. Accordingly, the temperature of the surface of the second composite material layer 30 is lowered, the temperature change amount is transferred to the lower side of the second composite material layer 30, and the temperature change amount may be detected by the first composite material layer 10. This degree of temperature change amount may be quantified and converted into the resistance change amount through the electrode layer 20.

Conventionally, there was a problem that the degree of coolness as the cosmetic materials evaporated after applying the cosmetic materials to the skin had to depend on the human sense, but the degree of coolness may be quantitatively measured through the sensor for measuring a temperature change amount 1. Such a sensor for measuring a temperature change amount 1 may be used not only in a cosmetics company that manufactures cosmetic materials, but also has the advantage of being able to numerically show the degree of coolness felt by using cosmetics to consumers.

FIG. 5 is a graph in which the degree of coolness felt over time after the cosmetic materials is applied to the sensor for measuring a temperature change amount 1 is measured as the resistance change amount.

Referring to FIG. 5, in the graph, k represents an experimental example using carbon nanotubes (CNT) and polydimethylsiloxane (PDMS) as materials of the second composite material layer 30, and j represents a comparative example in which only polydimethylsiloxane (PDMS) is used as the material of the second composite material layer 30.

In the graph, the x-axis represents time, and the y-axis represents the amount of temperature change as the change in resistance. The peak value (maximum value) of the y-axis may be understood as indicating the degree of coolness that a person can feel.

In this embodiment, by forming the sensor for measuring a temperature change amount 1 with the second composite material layer 30 formed of the above-described materials, thermal conductivity can be increased, and the temperature change amount can be measured in seconds (s).

For example, when measured with the second composite material layer 30 provided with carbon nanotubes (CNT) and polydimethylsiloxane (PDMS), and a cosmetic materials sample applied to the second composite material layer 30 which is mixed with water, a thickener and polyol in a preset ratio, the degree of coolness measured by the sensor for measuring a temperature change amount 1 may be quantified as 1.047 (R/R0). At this time, the range of 0 to 70 seconds (s) on the x-axis (time) shown in FIG. 5 is the time when the sensor for measuring a temperature change amount 1 is stabilized, and at the time that the sensor for measuring a temperature change amount 1 reaches the stabilized 70 seconds (s), it may be understood that the cosmetic materials sample is applied to the top of the sensor for measuring a temperature change amount 1. That is, after the cosmetic materials sample is uniformly applied to the upper portion of the sensor for measuring a temperature change amount 1, it may be understood that the time to reach the peak value of 1.047 (R/R0) is 10 seconds (s). In addition, when the experiment was performed under the same conditions but only PDMS was used as the material of the second composite material layer 30, the degree of coolness may be expressed as 1.045 (R/R0).

That is, when carbon nanotubes (CNT) and polydimethylsiloxane (PDMS) are used as the materials of the second composite material layer 30, a temperature change may be more sensitively detected than when only PDMS is used.

FIG. 6 is a graph illustrating a resistance change measured when an external force (pressure) is applied to the sensor for measuring a temperature change amount 1 of FIG. 1.

In FIG. 6, m is a graph of an embodiment showing a resistance change according to a change in an external force when the first electrode 210 and the second electrode 220 are disposed on the same plane as in FIG. 1.

In FIG. 6, n is a graph of a comparative example showing a resistance change according to an external force change when two electrodes are disposed on different planes (when stacked between the first composite material layers 10).

While the user applies cosmetic materials to the sensor for measuring a temperature change amount 1, a pressure change may occur by touching the sensor for measuring a temperature change amount 1. However, in this embodiment, by disposing the first electrode 210 and the second electrode 220 on the same plane, the sensor for measuring a temperature change amount 1 is configured to measure only the temperature change regardless of the pressure change. Such a configuration result may be confirmed from the experimental result in which the resistance value is constant regardless of the pressure change in the graph m of FIG. 6.

FIG. 7 schematically shows a matching system 1000 that can compare the numerical value for coolness measured by the sensor for measuring a temperature change amount 1 of FIG. 1 with the numerical value for coolness measured by an expert panel, and FIG. 8 is a graph illustrating a comparison of the numerical value of the coolness measured by the sensor for measuring a temperature change amount 1 of FIG. 1 and the numerical value of the coolness sensed by the expert panel.

Referring to FIGS. 7 and 8, the matching system 1000 may include the sensor for measuring a temperature change amount 1 that can represent the amount of temperature change as the resistance change amount, a server 3 that can compare the numerical value for coolness measured by the sensor for measuring a temperature change amount 1 and the numerical value for coolness input from a panel terminal 2, and the panel terminal 2 that can receive the numerical value for coolness measured by the expert panel and transmit it to the server 3. In this connection, the sensor for measuring a temperature change amount 1, the server 3, and the panel terminal 2 may communicate with each other wirelessly through a communication network, or transmit and receive data through wired communication.

The server 3 may convert the resistance change amount measured by the sensor for measuring a temperature change amount 1 into a first preset numerical value for coolness.

The server 3 may compare and represent the second numerical value for coolness input from the panel terminal 2 with the first numerical value converted from the resistance change amount measured by the sensor for measuring a temperature change amount 1.

Also, the matching system 1000 may include a database 4 that stores a correlation between a resistance change amount and a first numerical value. For example, the resistance change amount (R/R0) measured by the sensor for measuring a temperature change amount 1 may represent a range between 1.00 and 1.50, and the first numerical value that is the degree of coolness corresponding thereto may be quantified as 5.0 to 10.0 and stored in the database 4. Herein, the first numerical value may be set to meet the evaluation criteria for the existing coolness.

In addition, by the server 3, the data on the correlation between the resistance change amount and the first numerical value stored in the database 4 may be updated. In this case, the server 3 may analyze the resistance change amount (R/R0) measured by the sensor for measuring a temperature change amount 1 through machine learning, and may update the data stored in the database 4 by reflecting the analysis result.

A process in which the result value for coolness measured by the sensor for measuring a temperature change amount 1 through the matching system 1000 of this embodiment and the result value for the coolness input from the panel terminal 2 are matched and compared will be described below.

The degree of coolness according to the evaporation of the cosmetic materials may be measured as the resistance change amount by the sensor for measuring a temperature change amount 1, and the resistance change amount may be transferred to the server 3. Then, the resistance change amount (e.g., 1.2(R/R0)) may be converted into a result value of coolness (e.g., 7.0) by the server 3.

Thereafter, the result value of coolness measured by the expert panel (e.g., 7.0 (R/R0)) may be input to the panel terminal 2, and the result value of the coolness input to the panel terminal 2 may be transferred to the server 3.

Thereafter, the degree of coolness measured by the sensor for measuring a temperature change amount 1 and the degree of coolness input from the panel terminal 2 may be compared and displayed by the server 3. In this case, the matching system 1000 may further include a display device (not shown) capable of visually comparing and displaying two values.

P shown in FIG. 8 represents a coolness result value of 7 input from the panel terminal 2 and a coolness result value 7 measured by the sensor for measuring a temperature change amount 1. In addition, Q shown in FIG. 8 represents 9.4, which is a result value of coolness input from the panel terminal 2, and 9.3, a result value of coolness, which is measured by the sensor for measuring a temperature change amount 1. As such, referring to FIG. 8, it can be seen that the degree of coolness measured by the temperature change measuring sensor 1 and the degree of coolness measured by the expert panel are almost identical.

Therefore, by matching the degree of coolness measured by the sensor for measuring a temperature change amount 1 with the degree of coolness measured by the expert panel through the matching system 1000 according to the embodiment of the present invention, the result of coolness that meets the existing evaluation criteria may be derived. Hereinafter, an effect of the sensor for measuring a temperature change amount 1 according to an embodiment of the present invention will be described.

Conventionally, there was a problem that the degree of coolness as the cosmetic materials evaporated after applying the cosmetic materials to the skin had to depend on the human sense, but the degree of coolness may be quantitatively measured through the sensor for measuring a temperature change amount 1 of this embodiment. Such a sensor for measuring a temperature change amount 1 may be used not only by a cosmetics company that manufactures cosmetic materials, but also may have the advantage of being able to numerically show the degree of coolness felt by using cosmetics to consumers.

In addition, when the degree of coolness of various cosmetic raw materials is quantified through the sensor for measuring a temperature change amount 1, a database for coolness may be built.

In addition, by forming the second composite material layer 30 of the sensor for measuring a temperature change amount 1 with a composite material with high thermal conductivity, when the cosmetic materials are applied on the upper side of the second composite material layer 30, the degree of temperature change as the cosmetic is evaporated may be quickly transferred to the first composite material layer 10.

In other words, by providing the second composite material layer 30 as a composite material having high thermal conductivity, the degree of coolness according to the evaporation of the cosmetic may be effectively transferred.

In addition, by forming the second composite material layer 30 to a thin thickness, a temperature change according to the evaporation of the cosmetic materials may be effectively transferred.

In addition, by arranging the first electrode 210 and the second electrode 220 of the electrode layer 20 on the same plane, regardless of the force (pressure) applied to the sensor for measuring a temperature change amount 1, the temperature change amount occurring in the sensor for measuring a temperature change amount 1 may be measured.

Since the first horizontal electrode 214 and the second horizontal electrode 224 are alternately arranged with each other, the temperature change amount occurring in the entire sensor for measuring a temperature change amount 1 may be more precisely measured.

In addition, when the second composite material layer 30 is formed of carbon nanotubes (CNT) and polydimethylsiloxane (PDMS), and the weight ratio of carbon nanotubes (CNT) is 15% to 20%, there is an advantage in that the thermal conductivity of the second composite material layer 30 may be further increased.

The following is a listing of embodiments of the present invention.

In item 1, a sensor for measuring a temperature change amount may be provided, wherein the sensor includes: a first composite material layer including a polymer having a volume changing according to a temperature change amount; an electrode layer provided on one side of the first composite material layer and capable of representing the temperature change amount as a resistance change amount; and a second composite material layer, at least a portion of which is provided above the first composite material layer, containing at least one of carbon nanotube (CNT), boron nitride nanotube (BNNT) and grapheme, and containing polydimethylsiloxane (PDMS) or containing a thermoplastic polyurethane elastomer (TPU) to transfer the temperature change occurring on one side to the other side.

In item 2, the sensor for measuring a temperature change amount of item 1 in which the thickness of the second composite material layer is 1 μm to 30 μm, may be provided.

In item 3, the sensor for measuring a temperature change amount of items 1 and 2 in which the second composite material layer is formed of carbon nanotubes (CNT) and polydimethylsiloxane (PDMS), wherein the weight ratio of the carbon nanotubes (CNT) is 15% to 20%, may be provided.

In item 4, the sensor for measuring a temperature change amount of items 1 to 3 in which the second composite material layer is formed of a thermoplastic polyurethane elastomer (TPU), wherein the thickness of the second composite material layer is provided in a range of 1 μm to 10 μm, may be provided.

In item 5, the sensor for measuring a temperature change amount of items 1 to 4 in which the electrode layer may include: a first electrode disposed on an upper side of the first composite material layer; and a second electrode spaced apart from the first electrode, wherein the first electrode and the second electrode are disposed on the same plane, may be provided.

In item 6, the sensor for measuring a temperature change amount of items 1 to 5 in which the first electrode includes: a first vertical electrode disposed in one direction; and a plurality of first horizontal electrodes extending at a preset angle from the first vertical electrode, and the second electrode includes: a second vertical electrode disposed in one direction; and a plurality of second horizontal electrodes extending at a preset angle from the second vertical electrode, wherein the plurality of first horizontal electrodes and the plurality of second horizontal electrodes are alternately disposed and parallel to each other, may be provided.

In item 7, the sensor for measuring a temperature change amount of items 1 to 6 in which the second composite material layer is in contact with the first electrode and the second electrode, and at the same time, is in contact with the first composite material layer between the first electrode and the second electrode may be provided.

In item 8, the sensor for measuring a temperature change amount of items 1 to 7 in which the upper surface of the second composite material layer is flat, and the lower surface of the second composite material layer is provided with a convex portion for filling the gap between the first electrode and the second electrode may be provided.

In item 9, the sensor for measuring a temperature change amount of items 1 to 8 in which the first composite material layer contains polyvinylidene fluoride (PVDF), graphene oxide (rGO), and a semi-crystalline polymer mixed with polyvinylidene fluoride (PVDF) and graphene oxide (rGO) may be provided.

In item 10, the sensor for measuring a temperature change amount of item 9 in which the semi-crystalline polymer is polyethylene oxide (PEO) may be provided.

In item 11, a matching system may be provided, the matching system including: a server capable of converting a resistance change amount measured by the sensor for measuring a temperature change amount of items 1 to 10 into a first preset numerical value for coolness, wherein the server may compare and represent the first numerical value with the second numerical value for coolness input from the panel terminal, may be provided.

In item 12, the matching system of item 11 further comprising: a database storing a correlation between the resistance change amount and the first numerical value, wherein the correlation between the resistance change amount and the first numerical value may be updated by the server, may be provided.

Above, the sensor for measuring a temperature change amount according to the embodiment of the present invention has been described as a specific embodiment, but this is only an example, and the present invention is not limited thereto, and it should be interpreted as having the widest range according to the basic idea disclosed in the present specification. A person skilled in the art may implement a pattern of a shape not specified by combining or substituting the disclosed embodiments, but this also does not depart from the scope of the present invention. In addition, a person skilled in the art can easily change or modify the disclosed embodiments based on the present specification, and it is clear that such changes or modifications also fall within the scope of the present invention.

INDUSTRIAL APPLICABILITY

The present invention is applicable to the field of sensor for measuring a temperature change amounts.

The invention claimed is:

1. A sensor for measuring a temperature change amount of a cosmetic material, comprising:
   a first composite material layer including a polymer having a volume changing according to a temperature change amount;
   an electrode layer provided on one side of the first composite material layer and capable of representing the temperature change amount as a resistance change amount; and
   a second composite material layer, at least a portion of which is provided on the first composite material layer, containing carbon nanotube (CNT), boron nitride nanotube (BNNT), graphene, and polydimethylsiloxane (PDMS) to transfer the temperature change occurring on one side to the other side,
   wherein the second composite material layer has a thickness of 1 μm to 30 μm, and
   wherein the cosmetic material is applied to the second composite material layer.

2. The sensor for measuring a temperature change amount of claim 1, wherein the electrode layer includes:
   a first electrode disposed on an upper side of the first composite material layer; and
   a second electrode spaced apart from the first electrode, and
   wherein the first electrode and the second electrode are disposed on the same plane.

3. The sensor for measuring a temperature change amount of claim 2, wherein the first electrode includes:
   a first vertical electrode disposed in one direction; and
   a plurality of first horizontal electrodes extending at a preset angle from the first vertical electrode;
   the second electrode includes:
   a second vertical electrode disposed in one direction; and
   a plurality of second horizontal electrodes extending at a preset angle from the second vertical electrode; and
   wherein the plurality of first horizontal electrodes and the plurality of second horizontal electrodes are alternately arranged and parallel to each other.

4. The sensor for measuring a temperature change amount of claim 2, wherein the second composite material layer is in contact with the first electrode and the second electrode, and at the same time, is in contact with the first composite material layer between the first electrode and the second electrode.

5. The sensor for measuring a temperature change amount of claim 2, wherein the second composite material layer comprises a first surface that is flat, and a second surface, that is opposite to the first surface and is provided with a convex portion for filling a gap between the first electrode and the second electrode.

6. The sensor for measuring a temperature change amount of claim 1, wherein the first composite material layer contains:
   polyvinylidene fluoride (PVDF), graphene oxide (rGO), and a semi-crystalline polymer mixed with polyvinylidene fluoride (PVDF) and graphene oxide (rGO).

7. The sensor for measuring a temperature change amount of claim 6, wherein the semi-crystalline polymer is polyethylene oxide (PEO).

8. A matching system comprising:
   a server capable of converting a resistance change amount measured by the sensor for measuring a temperature change amount of a cosmetic material according to claim 1 into a first preset numerical value for coolness, wherein the server is able to compare and represent a second numerical value for coolness input from a panel terminal with the first numerical value.

9. The matching system of claim 8, further comprising:
   a database storing a correlation between the resistance change amount and the first numerical value,
   wherein the correlation between the resistance change amount and the first numerical value can be updated by the server.

* * * * *